(12) United States Patent
Rosen

(10) Patent No.: US 6,283,415 B1
(45) Date of Patent: Sep. 4, 2001

(54) SIMPLIFIED YAW STEERING METHOD FOR SATELLITE ANTENNA BEAM CONTROL

(75) Inventor: Harold A. Rosen, Santa Monica, CA (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/301,965

(22) Filed: Apr. 29, 1999

(51) Int. Cl.⁷ ..................................................... B64G 1/24
(52) U.S. Cl. ............................ 244/164; 244/165; 342/354
(58) Field of Search ............................... 244/158 R, 164, 244/165, 166, 168, 169; 342/352–359; 701/13

(56) References Cited

U.S. PATENT DOCUMENTS

| | | | |
|---|---|---|---|
| 5,184,139 | * 2/1993 | Hirako et al. | 342/354 |
| 5,463,400 | * 10/1995 | Tayloe | 342/352 |
| 6,023,242 | * 2/2000 | Dixon | 342/359 |

* cited by examiner

Primary Examiner—Galen L. Barefoot
(74) Attorney, Agent, or Firm—T. Gudmestad

(57) ABSTRACT

For an antenna on a satellite in an inclined orbit about the Earth, cross-track motion resulting from the rotation of the Earth can be reduced in antenna coordinates by yawing the antenna (preferably by yawing the entire satellite, for example, by using a reaction wheel system) by an appropriate angle, which varies throughout the orbit.

13 Claims, 3 Drawing Sheets

SIMPLIFIED YAW STEERING METHOD FOR SATELLITE ANTENNA BEAM CONTROL

BACKGROUND OF THE INVENTION (a) Field of the Invention

The present invention relates generally to a method for steering a satellite antenna beam, and more particularly, to a method for simplifying the steering of an antenna beam on a satellite in an inclined earth orbit in order to compensate for cross-track motion of earth-based terminals that is caused by rotation of the Earth.

(b) Description of Related Art

Antenna systems for communication satellites that are in non-geostationary orbits may require continuous adjustment of beam steering directions relative to the satellite to maintain coverage of users located within an earth-fixed cell during the pass of the satellite over the cell. The direction from the satellite to the users in satellite coordinates is affected by the rotation of the Earth as well as by the orbital motion of the satellite. The surface speed of the Earth due to rotation is proportional to the cosine of the latitude of the satellite, which varies throughout the orbit for all but equatorial (zero-inclination) orbits. This variation of relative velocity as a function of latitude normally requires beam steering in the cross-track direction (i.e., orthogonal to the velocity vector of the satellite) as well as in the along-track direction (i.e., along the velocity vector of the satellite), which in turn results in excessively complicated and cumbersome beam steering systems.

If the satellite antenna system is an electronically steered, high gain, low side lobe multibeam array, antenna steering may involve the control of the phase and amplitude of many elements. The number of active control elements required is substantially increased when beam steering is required in the cross-track direction as well as the along-track direction. This is normally the case, since for an antenna array aligned with the satellite geometric axes, cross-track motion results from the rotation of the Earth.

SUMMARY OF THE INVENTION

By using a fairly simple yaw steering method for the satellite, cross-track beam steering can be avoided, thereby greatly simplifying the antenna beam control steering system In accordance with the present invention, cross-track motion of ground targets resulting from the rotation of the Earth can be dramatically reduced in antenna coordinates by yawing the antenna (preferably by yawing the entire satellite, for example, by using a reaction wheel system) by an appropriate angle, which varies throughout the orbit. The yaw steering method in accordance with the present invention, which is easy to implement, results in a considerable simplification of the antenna beam steering system.

The yaw steering method of the present invention uses a yaw angle $\phi$, which is a function of the time from the ascending node of the orbit of the satellite, the period of the orbit and the inclination of the orbit. Assuming a circular orbit the desired yaw angle $\phi$, in accordance with the present invention, is given by the expression:

$$\tan(\phi)) = [\sin(i)\cos(2\pi t/P)]/[(D/P) - \cos(i)]$$

where:

$\phi$ is the desired yaw angle;
i is the inclination of the orbit;
t is the time in the orbit of the satellite from the ascending node of the orbit;
P is the period of the orbit; and
D is the period of the rotation of the Earth.

For polar orbits, the inclination, i, is 90° and the expression for the desired yaw angle, $\phi$, reduces to:

$$\tan(\phi) = (P/D) \cos(2\pi t/P).$$

In accordance with one aspect of the present invention, a method is provided for steering a satellite antenna mounted to a satellite. The satellite has a pitch axis, a roll axis, and a yaw axis and travels in an orbit around a rotating object. The orbit has an inclination and an ascending node. The method comprises the steps of: determining the inclination of the orbit; determining the time in the orbit from the ascending node; determining the period of the orbit; determining the period of the rotation of the object; and steering the antenna about the yaw axis by an angle, $\phi$, wherein $\phi$ is a function of the inclination of the orbit, the time in the orbit from the ascending node, the period of the orbit, and the period of the rotation of the object.

In accordance with a further aspect of the present invention, the steering step includes a step of calculating the angle $\phi$ using the formula: $\phi = \arctan[[\sin(i)\cos(2\pi t/P)]/[(D/P) - \cos(i)]]$, where i is the inclination of the orbit, t is the time in the orbit from the ascending node, P is the period of the orbit, and D is the period of the rotation of the object.

In accordance with yet another aspect of the present invention, a method is provided for steering a satellite antenna mounted to a satellite. The satellite has a pitch axis, a roll axis, and a yaw axis, and travels in an orbit around the Earth, the orbit having an inclination and an ascending node. The method comprises the steps of: determining the inclination of the orbit; determining the time in the orbit from the ascending node; determining the period of the orbit; and steering the antenna about the yaw axis by an angle, $\phi$, wherein $\phi$ is a function of the inclination of the orbit, the time in the orbit from the ascending node, the period of the orbit, and the period of the rotation of the Earth.

The use of the present invention for an antenna mounted to a satellite in a low-earth orbit inclined at about 85 degrees at an altitude of about 1400 km (about 870 miles) is predicted to reduce the cross-track path of a ground target relative to the antenna from about 4.5 degrees to about 0.04 degrees.

The invention itself, together with further objects and attendant advantages, will be best understood by reference to the following detailed description, taken in conjunction with the accompanying drawing.

DESCRIPTION OF THE PREFERRED EMBODIMENT

The invention will now be described in connection with a current application of the inventive method of yaw steering.

Figure 1:
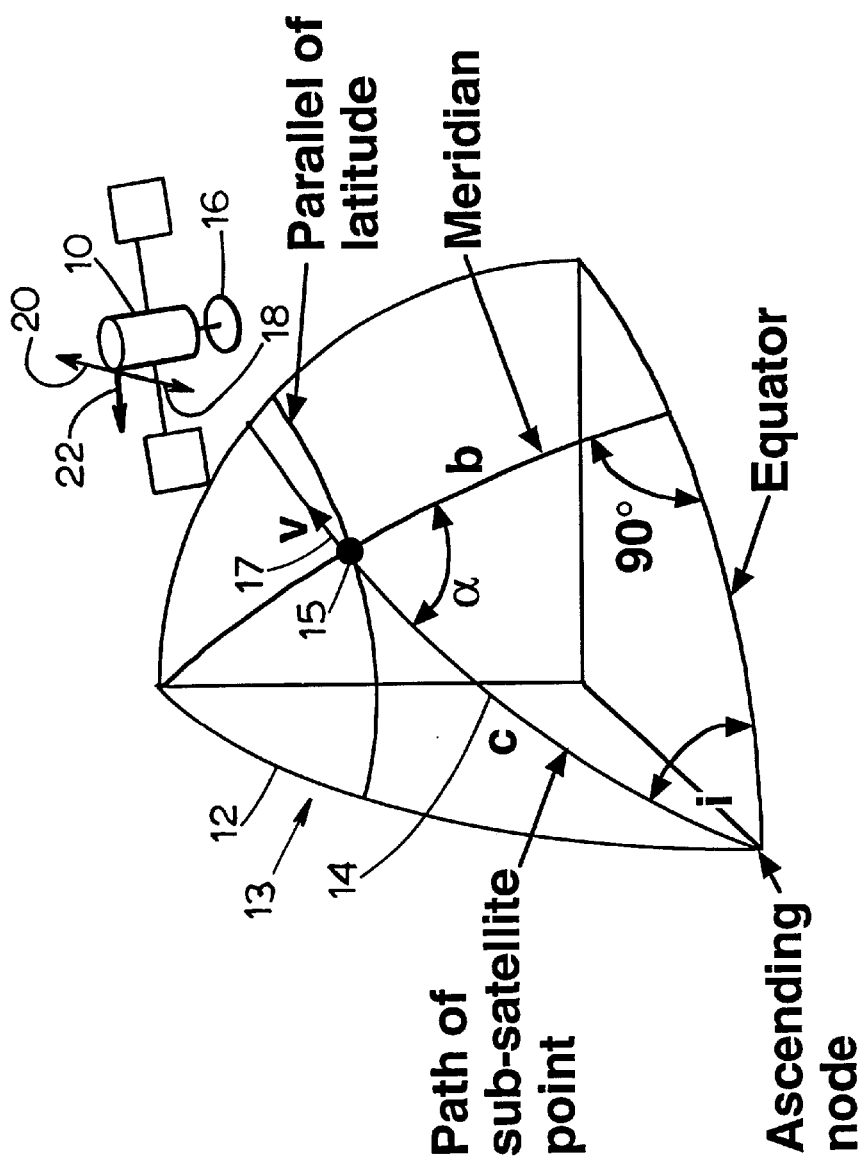
FIG. 1 is a schematic view of an exemplary satellite capable of being used for carrying out the method of the present invention, and the ground track of the satellite on a quadrant of the Earth.

FIG. 1 schematically shows a satellite 10 in an inclined, circular low-earth orbit over a quadrant 12 of the northern hemisphere of the Earth 13. A curve in FIG. 1 designated 14, represents the path of a sub-satellite point 15 (i.e., a point on the surface of the Earth 13 directly below the satellite 10), as the sub-satellite point 15 travels across the quadrant 12 of the Earth 13. The sub-satellite point 15 travels at a velocity v in a direction indicated by an arrow 17. An antenna 16 is mounted to the satellite 10. A satellite-fixed coordinate system is depicted in FIG. 1 as follows: a yaw axis 18, a roll axis 20, and a pitch axis 22.

Figure 2:
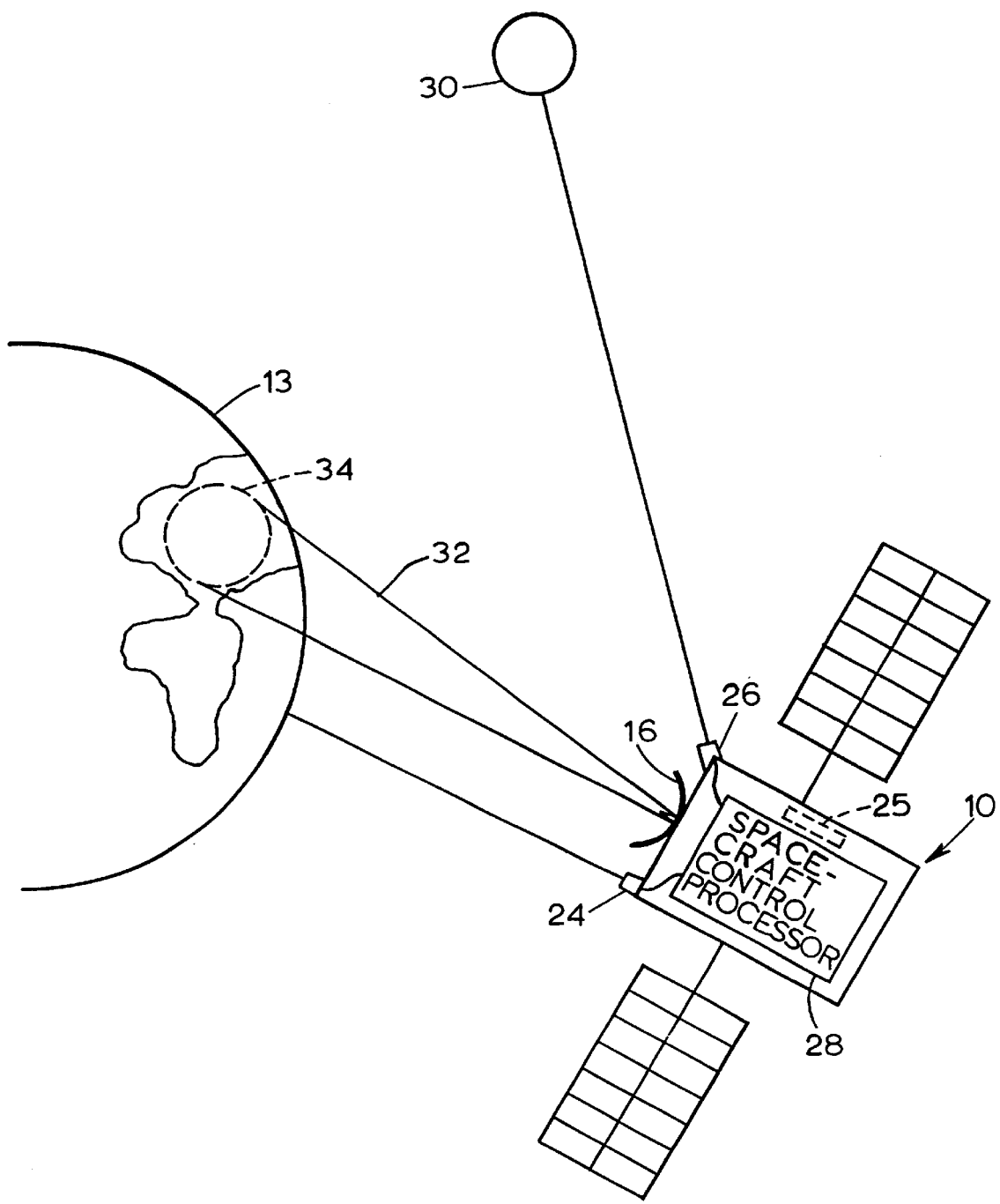
FIG. 2 is a more detailed schematic diagram of the satellite shown in FIG. 1, further illustrating an apparatus for carrying out the method of the present invention.

Referring now to FIG. 2, the satellite 10 in which the present invention may be implemented is shown in further detail. In addition to the antenna 16, the satellite 10 further includes an earth sensor 24, a reaction wheel system 25, a sun sensor 26, a spacecraft control processor 28. The earth sensor 24 and the sun sensor 26 sense the attitude of the satellite 10 with respect to the Earth 13 and the Sun 30. The antenna 16 projects an electromagnetic beam 32 onto a coverage area 34 on the Earth 13.

The earth sensor 24 and the sun sensor 26 are only two examples of attitude sensors, and other types of attitude sensors may be used in attitude determination systems. Alternatively, attitude sensors may use beacons, constellations, or other heavenly bodies as reference objects. Output signals from the attitude sensors 24, 26 are fed to the spacecraft control processor 28, which is responsible for attitude determination and adjustment.

Command signals from the spacecraft control processor 28 are sent to the reaction wheel system 25 to adjust the attitude of the satellite 10. The reaction wheel system 25 is only one example of a device that can be used to adjust the attitude of the satellite 10. Alternatively, other devices, such as, for example, chemical or electrical thrusters could be used to adjust the attitude of the satellite 10 in response to commands from the spacecraft control processor 28.

Figure 3:
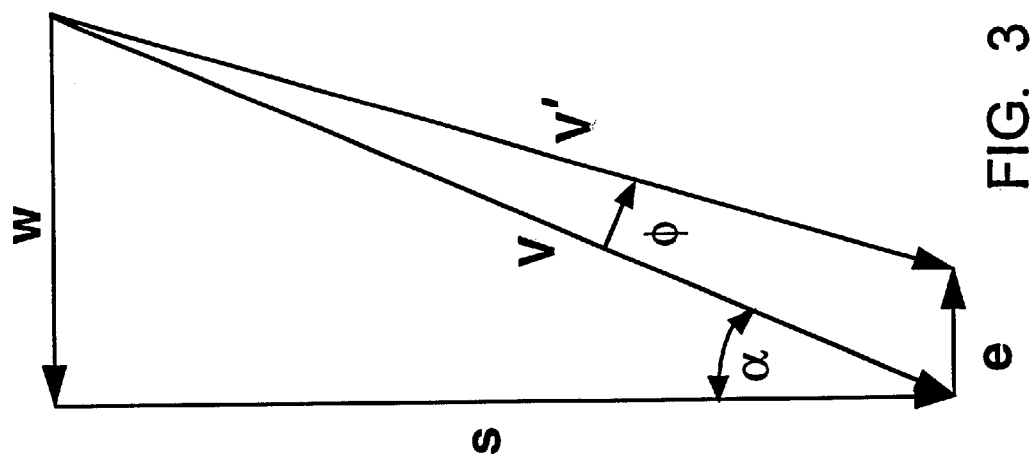
FIG. 3 is a schematic vectorial representation of the velocity of an earth-based terminal in a satellite-based frame of reference.

FIG. 3 shows a vectorial derivation of the velocity of an earth-based terminal in a satellite-based frame of reference. The expression for the desired yaw angle, $\phi$, is derived as follows. When the satellite 10 is traveling in a northeasterly direction, as illustrated by the arrow 17 in FIG. 1, the orbital motion of the satellite 10 causes a user on the Earth 13 to appear to be moving southwesterly in a frame of reference fixed to the satellite 10. The motion of the Earth 13 due to its rotation adds a relatively small eastward component, giving a clockwise rotation of the resultant motion vector as shown in FIG. 3. As set forth in further detail below, the application of standard trigonometric identities to this construction shown in FIG. 3, results in the expression for the desired yaw angle, $\phi$.

Even though the desired yaw angle $\phi$ is relatively small for low altitude satellites, it necessitates a component of beam steering in a direction perpendicular to the motion of the satellite. If many narrow beams are used to enhance the communication capacity of the satellites, many thousands of electronically controlled adjustments may be required to steer these narrow beams.

Reducing the beam steering complexity by implementing a one-dimensional system of yaw steering according to the present invention can reduce the number of active control elements to a small fraction of those required for a two-dimensional steering case. The implementation of the yaw steering method of the present invention adds no more complexity to the satellite than that of a single active antenna control element, versus thousands of such control elements eliminated by the yaw steering method. Because the frequency of the yaw steering method is so low, one cycle per orbit, the mechanical power associated with the yaw steering method is negligible.

With reference to FIGS. 1 and 3, the desired yaw angle, $\phi$ is derived as follows:

$$\phi = \tan^{-1}\frac{s}{w-e} - \tan^{-1}\frac{s}{w}$$

$$\tan\phi = \frac{se}{s^2 + w^2 - we} = \frac{se}{V^2 - we}$$

$$w = V\sin\alpha$$

$$s = V\cos\alpha$$

$$e = E\cos b$$

$$\cos i = \cos b \sin\alpha$$

$$\cot\alpha = \cos c \tan i$$

$$\tan\phi = \frac{\cos c \sin i}{\frac{V}{E} - \cos i}$$

where:
  i is the orbital inclination angle (FIG. 1);
  c is the orbital arc from the ascending node to the sub-satellite point 15 (FIG. 1);
  b is the latitude of the satellite 10 (FIG. 1);
  a is the angle between the velocity vector of the sub-satellite point 15 and the meridian (FIGS. 1 and 3);
  V is the velocity of the sub-satellite point 15 in the satellite frame of reference (FIGS. 1 and 3);
  s is the south component of V (FIG. 3);
  w is the west component of V (IG. 3); and
  E is the surface speed of the Earth 13 at the equator (equal to about 1,524 feet per second or about 465 meters per second).
  V', shown in FIG. 3, is the velocity of an earth-based terminal in the satellite frame of reference after performing the yaw correction by an angle of $\phi$.

Figure 4:
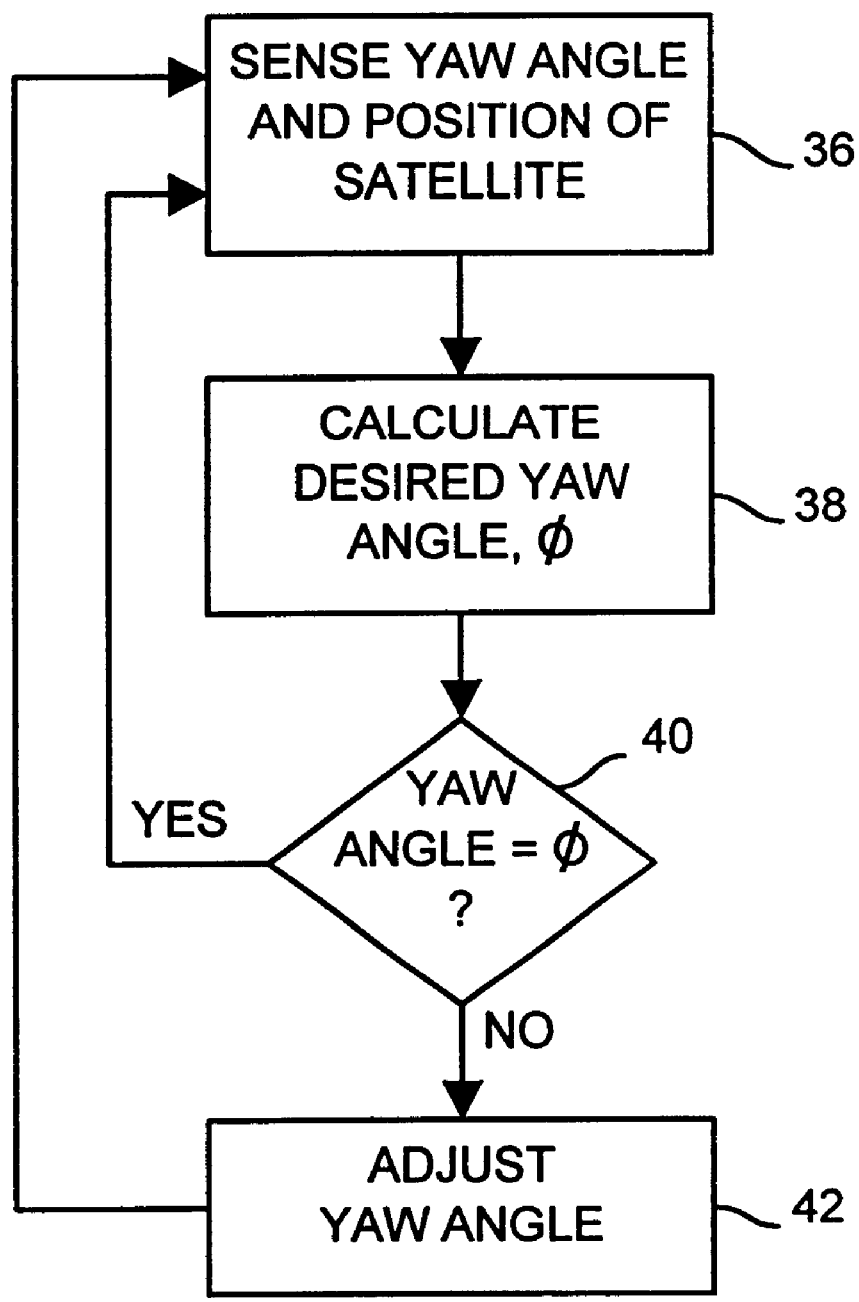
FIG. 4 is a flow diagram illustrating the method of the present invention.

FIG. 4 is a flow diagram illustrating how the method of the present invention can be carried out using the spacecraft control module 28 on the satellite 10. As will be readily understood by those skilled in the art, the method can be carried out using either software or hardware programmed appropriately. First, at block 36, the spacecraft control module 28 determines the position of the satellite 10 and the yaw angle of the satellite 10. Next, at block 38, the spacecraft control module 28 calculates the desired yaw angle, $\phi$. At block 40, the spacecraft control module 28 then compares the yaw angle of the satellite 10 to the desired yaw angle, $\phi$. If no yaw angle adjustment is needed, the spacecraft control module 28 returns to block 36 and repeats the determination of the position of the satellite 10 and the yaw angle of the satellite 10. If yaw angle adjustment is needed, the spacecraft control module 28 sends an appropriate set of commands to the reaction wheel system 25 in order to adjust the yaw angle of the satellite 10 to the desired yaw angle, $\phi$, as indicated at block 42. The spacecraft control module 28 then returns to block 36 and repeats the determination of the position of the satellite 10 and the yaw angle of the satellite 10.

If desired, the antenna 16 could be steered by appropriate actuators mounted to the satellite 10, instead of adjusting the yaw angle of the entire satellite 10. However, and as noted above, because the frequency of the yaw steering method is so low, one cycle per orbit, the mechanical power associated with the yaw steering method is negligible. Accordingly, to minimize the complexity of the satellite 10, it may be preferable to adjust the yaw angle of the entire satellite 10 using the reaction wheel system 25 instead of using an additional mechanism to steer the antenna 16.

The present invention has been described with reference to specific examples, which are intended to be illustrative only, and not to be limiting of the invention, as it will be apparent to those of ordinary skill in the art that changes, additions and/or deletions may be made to the disclosed embodiments without departing from the spirit and scope of the invention.

What is claimed is:

1. A method of steering a satellite antenna mounted to a satellite having a pitch axis, a roll axis, and a yaw axis, the satellite traveling in an orbit around a rotating object, the orbit having an inclination and an ascending node, the method comprising the steps of:

determining the inclination of the orbit;

determining the time in the orbit from the ascending node;

determining the period of the orbit;

determining the period of the rotation of the object; and steering the antenna about the yaw axis by an angle, $\phi$, wherein $\phi$ is a function of the inclination of the orbit, the time in the orbit from the ascending node, the period of the orbit, and the period of the rotation of the object.

2. The method of claim 1, wherein the steering step includes a step of steering the satellite about the yaw axis by the angle $\phi$.

3. The method of claim 1, wherein the steering step includes a step of calculating the angle $\phi$ using the formula: $\phi=\arctan[[\sin(i)\cos(2\pi t/P)]/[(D/P)-\cos(i)]]$, where i is the inclination of the orbit, t is the time in the orbit from the ascending node, P is the period of the orbit, and D is the period of the rotation of the object.

4. The method of claim 3, wherein the steering step includes a step of steering the satellite about the yaw axis by the angle $\phi$.

5. A method for steering a satellite antenna mounted to a satellite having a pitch axis, a roll axis, and a yaw axis, the satellite traveling in an orbit around the Earth, the orbit having an inclination and an ascending node, the method comprising the steps of:

determining the inclination of the orbit;

determining the time in the orbit from the ascending node;

determining the period of the orbit; and steering the antenna about the yaw axis by an angle, $\phi$, wherein $\phi$ is a function of the inclination of the orbit, the time in the orbit from the ascending node, the period of the orbit, and the period of the rotation of the Earth.

6. The method of claim 5, wherein the steering step includes a step of steering the satellite about the yaw axis by the angle $\phi$.

7. The method of claim 5, wherein the steering step includes a step of calculating the angle $\phi$ using the formula: $\phi=\arctan[[\sin(i)\cos(2\pi t/P)]/[(D/P)-\cos(i)]]$, where i is the inclination of the orbit, t is the time in the orbit from the ascending node, P is the period of the orbit, and D is the period of rotation of the Earth.

8. The method of claim 7, wherein the steering step includes a step of steering the satellite about the yaw by the angle $\phi$.

9. A method for reducing pointing errors while steering a satellite antenna mounted to a satellite having a pitch axis, a roll axis, and a yaw axis, the satellite traveling in an orbit around a rotating object, the orbit having an inclination and an ascending node and the antenna pointed generally at a target area on the object, the method comprising the steps of:

determining the inclination of the orbit;

determining the time in the orbit from the ascending node;

determining the period of the orbit;

determining the period of the rotation of the object; and steering the antenna about the yaw axis by an angle, $\phi$, wherein $\phi$ is a function of the inclination of the orbit, the time in the orbit from the ascending node, the period of the orbit, and the period of the rotation of the object.

10. The method of claim 9, wherein the steering step includes a step of steering the satellite about the yaw axis by the angle $\phi$.

11. A satellite having a pitch axis, a roll axis, and a yaw axis, the satellite traveling in an orbit around a rotating object, the orbit having an inclination and an ascending node and the antenna pointed generally at a target area on the object, the satellite comprising:

a satellite antenna mounted to the satellite; and means for reducing pointing errors while steering the satellite antenna by steering the antenna about the yaw axis by an angle, $\phi$, wherein $\phi$ is a function of the inclination of the orbit, the time in the orbit from the ascending node, the period of the orbit, and the period of the rotation of the object.

12. The satellite of claim 11, wherein the means for reducing pointing errors includes means for calculating the angle $\phi$ using the formula: $\phi=\arctan[[\sin(i)\cos(2\pi t/P)]/[(D/P)-\cos(i)]]$, where i is the inclination of the orbit, t is the time in the orbit from the ascending node, P is the period of the orbit, and D is the period of rotation of the object.

13. The satellite of claim 11, wherein the means for reducing pointing errors includes means for steering the satellite about the yaw axis by the angle $\phi$.

\* \* \* \* \*